Figure 2:
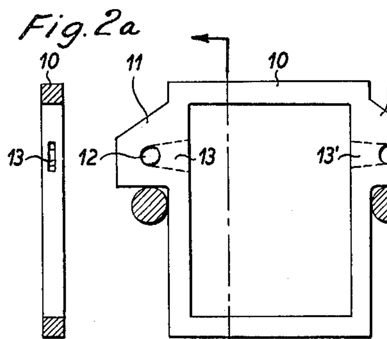

June 20, 1961 L. DEMETER 2,989,187

CHAMBER FILTER PRESSES

Filed Oct. 31, 1957 3 Sheets-Sheet 1

INVENTOR.
LÁSZLÓ DEMETER
BY
Irwin S. Thompson
ATTY.

June 20, 1961 L. DEMETER 2,989,187

CHAMBER FILTER PRESSES

Filed Oct. 31, 1957 3 Sheets-Sheet 2

INVENTOR.
LÁSZLÓ DEMETER
BY
Irwin S. Thompson
ATTY.

June 20, 1961 L. DEMETER 2,989,187

CHAMBER FILTER PRESSES

Filed Oct. 31, 1957 3 Sheets-Sheet 3

INVENTOR.
LÁSZLÓ DEMETER
BY
[signature]
ATTY.

United States Patent Office 2,989,187

Patented June 20, 1961

2,989,187

CHAMBER FILTER PRESSES

Laszlo Demeter, Budapest, Hungary, assignor to Licencia Talalmanyokat Ertekesitö Vallalat, Budapest, Hungary Filed Oct. 31, 1957, Ser. No. 693,745
1 Claim. (Cl. 210—227)

The invention relates to chamber filter presses. In known chamber filter presses the individual filter chambers are formed by frames and intermediate plates covered with filter cloth. The chambers can also be formed with plates with thickened edge strips abutting against each other. In known presses of this kind, the intermediate plates are provided with channels or grooves in which the filtrate flows away. These intermediate plates must, on account of the flow channels, be of correspondingly large dimensions, so that these intermediate walls constitute a considerable part of the whole filter press. For this reason, attempts have been made to reduce the number of these intermediate walls and to increase the clear width of the individual chambers, so that in this way the capacity of the press could be increased. The clear width of the individual chambers is in general at least 30–40 mm.

These filter presses are not suitable for filtering difficulty filterable fine suspensions, e.g. of clay, since after building up a filter cake of 10–15 mm. thickness the filtration is so slowed down that a compact filter cake filling the chamber cannot be produced. In the course of our experiments, we have made filtration tests with types of kaolin and clay of varying fineness and have determined the thickness of the filter cake in relation to the filtering time. In a surprising manner it has emerged that with such fine suspensions, the increase in the thickness of the filter cake up to a certain thickness is approximately proportional to the filtering time, thereafter, however, it proceeds exponentially.

The curve taken from these measurements has a sharp bend after which the thickness of the filter cake in relation to the time practically scarcely alters, so that this bend indicates the limit of the filtrability. Such curves are reproduced in FIGURE 1.

Curve I is the result with a fine kaolin suspension. The curve has a sharp bend at a thickness of filter cake between 20 and 25 mm. It will be seen from the curve that a filter cake of 20 mm. thickness is obtainable within 2 hours, whilst for a filter cake 25 mm. thick, 20 hours are necessary.

Curve II was made when filtering fine clay. Here the bend is at a thickness of filter cake between 12 mm. and 17 mm. A 12 mm. thick filter cake could be obtained in 2 hours, whilst a 17 mm. thick filter cake is only obtained after a filtering time of 20 hours. The thicknesses of the above mentioned filter cakes can, therefore, in practice, not be increased. With such filtering tests it is possible to determine for any suspension, that thickness of filter cake at which the said suspension can be economically filtered in filter presses. The clear space of the individual chambers of the filter press can then be selected accordingly. Since, however, in the filter presses generally used, the side walls of the chamber are provided with the conduits for taking off the filtrate, these side walls have to be of reltively large dimensions, so that these side walls constitute a considerable part of the filter presses.

In our experiments it has been found that in filter presses the discharge conduits on the side walls can be entirely omitted, and the filtrate can be taken off through the filter cloth held between the filter chambers, which filter cloth extends out of the filter chamber over the frames of the chamber and is in communication with the outside space.

It has further been shown that the side walls of the chamber can be produced from plates with smooth surfaces, so that for example sheet metal of a few millimetres thickness can be used for the side walls of the filter chamber.

It has furthermore been shown that it is advantageous if the side walls of the filter chamber on which the filter cloth lies is provided with a resilient coating for example of rubber or a plastic material. By this means the filter cloth is protected and a good and uniform seating on the gripping surfaces is ensured.

The liquid permeability of the filter cloth can be further substantially increased, if the filter cloth on its side remote from the filter chamber lies against a surface which is provided with crevices. These crevices which when filtering fine suspensions are preferably only 0.1–0.2 millimetres wide, can be formed on the metal side wall of the filter chamber or on the resilient coating.

Instead of the surface with crevices a metal or textile mesh mounted between the side wall of the chamber and the filter cloth can also be used. These measures are preferably used in the cases where one is working with relatively easily filterable suspensions, whereby the filtering time can be reduced. If the width of the crevices or of the interstices of the metal mesh is made correspondingly smaller than half the thickness of the filter cloth, the outflow of the filtrate is facilitated without the imperviousness of the filter cloth to the suspension on the clamping surface facing the filter chamber being disturbed.

In the arrangement according to the invention, therefore, chamber walls which are generally heavy and made of cast iron, provided with outflow channels and of correspondingly large dimensions are replaced by walls which are substantially thinner and simpler whereby the useful chamber space of the filter press can be increased and the weight of the filter press substantially decreased. Insofar as for any substance the easily obtainable filter cake thickness can be determined and the clear width of the filter chamber can be selected accordingly, it is possible to filter very fine suspensions economically in filter presses.

Figure 1:
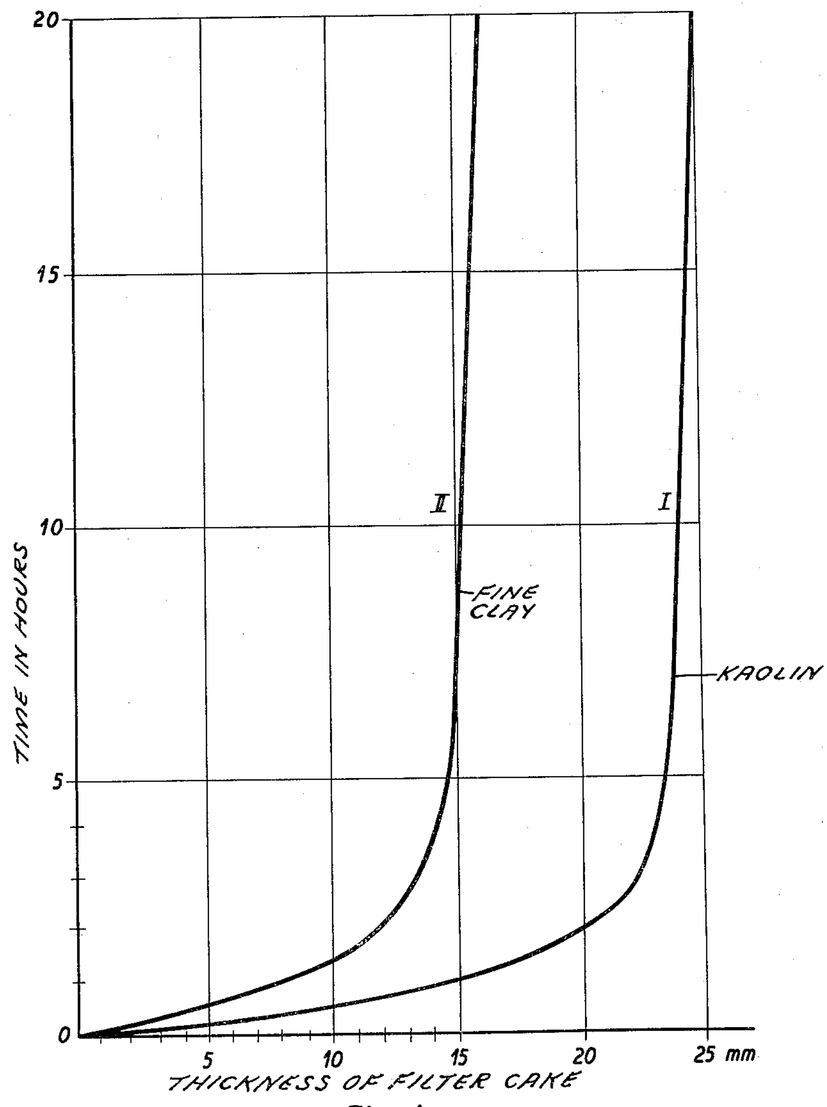

Some preferred embodiments by way of example of filter presses according to the invention will be further described with reference to the accompanying drawings in which:

FIGURE 1 shows the curves of filtering experiments in which the thickness of the filter cake in millimetres is indicated along the abscissa and the filtering time in hours along the ordinate.

Figure 5:
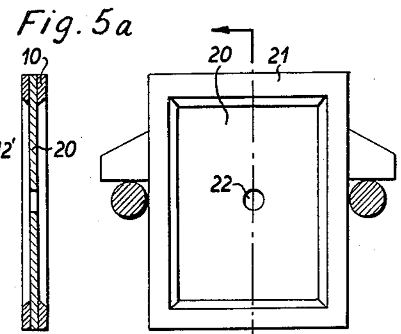
Figure 3:
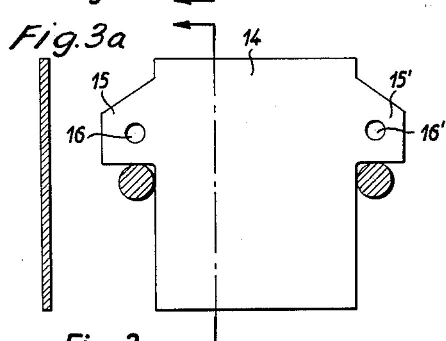
Figure 6:
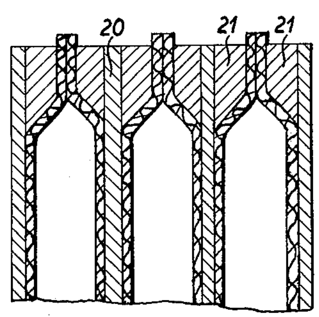
Figure 4:
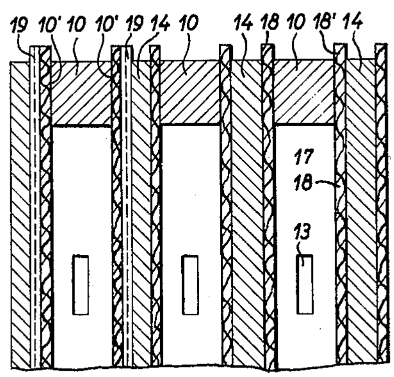
Figure 7:
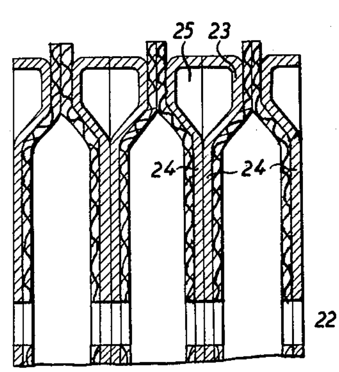
Figure 8:
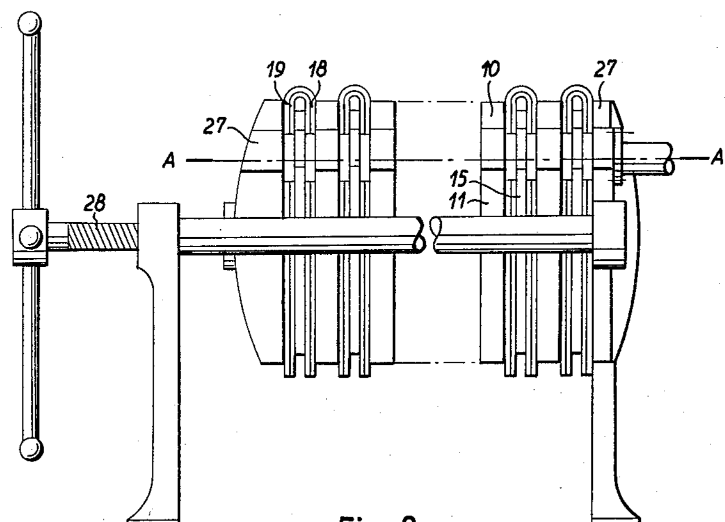
Figure 9:
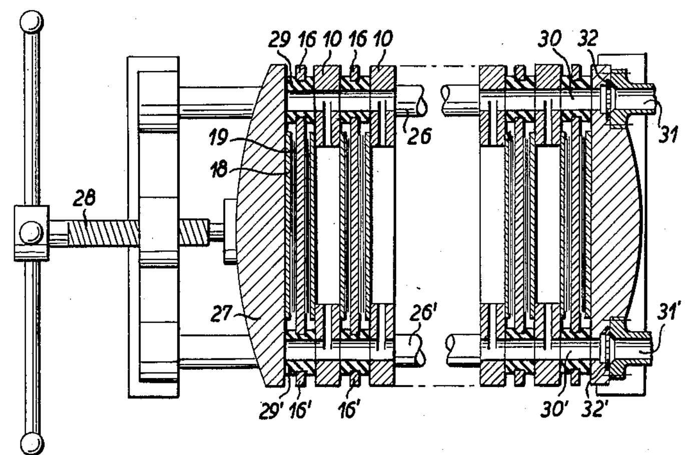

FIGURES 2 and 2*a* show a filter chamber frame in elevation and in section,

FIGURES 3 and 3*a* show a filter chamber wall in elevation and in section,

FIGURE 4 shows a part of a filter press which is made up of the frames and intermediate walls of FIGURES 2 and 3 respectively, FIGURES 5 and 5*a* show a filter chamber wall with a projecting frame in elevation and section, FIGURE 6 shows a partial section to an enlarged scale of a filter press which is made up of filter chamber walls according to FIGURE 5, FIGURE 7 shows a partial section of a filter press, which is similar to that of FIGURE 6, but in which the frame part is formed by the intermediate walls, FIGURE 8 shows a side view of a filter press, and FIGURE 9 is a section of such filter press along the line A—A of FIGURE 8.

Referring to FIGURES 2 to 4, filter chamber frames 10 have in the usual manner apertures 12, 12′ in the projecting lugs 11, 11′ which apertures form a part of the feed conduits. The apertures 12 and 12′ have branch conduits 13, 13'. The chamber walls are formed by metal plates 14 in the projecting lugs 15, 15' of which apertures 16, 16' are provided which lie in the region of the feed conduits.

It will be seen from FIGURE 4 that a filter cloth 18 is applied to both sides of the filter chamber 17, these cloths lying against the wall plates 14. The suspension to be filtered enters the filter chambers 17, through the branch conduits 13, 13' and the filtrate flows away between the fibres of the filter cloth 18 at the edge 18' which edge portion is clamped between the frame 10 and wall 14. Thus special discharge conduits on the chamber wall are not provided. If comparatively easily filtrable suspensions are to be filtered, the filter time can be reduced, if on the plate 14 crevices of dimensions of the order of tenths of a millimetre are formed and the cloth lies against a surface with such crevices. Instead of these crevices, a fine metal mesh or woven metal 19 or a textile coating, preferably a second filter cloth can be used.

The dimensions of the crevices or of the interstices in the metal or textile coating should be selected to be so small that the filter cloth lies against the clamping surface 10' facing the filter chamber so tightly with respect to the suspension that solid particles cannot escape from the chamber along the surface 10'.

FIGURES 8 and 9 show a filter press having the constituent parts of FIGURES 2 to 4.

The filter elements are carried by the rods 26, 26' and are pressed together by end plates 27, by means of the screw 28. Between the frames 10, rubber packing rings 29, 29' are disposed in the apertures 16, 16' and form part of the feed conduits 30, 30'. The suspension to be filtered is supplied through the conduits 31, 31' and through the protective filters 32, 32', which latter are formed as perforated discs and retain the coarse particles of the suspension to be filtered, thus preventing any blockage of the conduits 30, 30' and the branch conduits 13, 13'.

A filter cloth 18 is arranged on both sides of the filter chamber walls 14.

In the embodiments of FIGURES 5 and 6 a peripheral frame part 21 is welded onto the chamber walls 20 which frame part clamps the filter cloth. The substance to be filtered enters the filter chambers through the conduit, not shown in the drawing, passing through apertures 22. The frame parts 21 can also be made of a non-metallic material e.g. a plastic or rubber.

FIGURE 7 shows a similar embodiment to FIGURES 5 and 6 with the difference that the frame parts 23 are formed from the wall plates 24 which form a peripheral channel 25. The feed conduit is formed through the apertures 22.

What I claim is:

A filter press comprising a plurality of horizontally spaced vertical plate members having smooth and continuous surfaces, a plurality of frame members, each said frame member disposed between a pair of said vertical plate members to form a filter chamber, filter cloths disposed between said vertical plate members and said frame members and abutting the entire surface of said vertical plate members, woven members having interstices of a size less than half the thickness of the filter cloths disposed underneath said filter cloths and against the entire surface of said vertical plate members, means for clamping said filter cloths and woven members between said vertical plate members and said frame members, and means extending through said frame members to supply material to be filtered to each filter chamber, said filter cloths and woven members extending beyond the peripheral extent of said vertical plate members and frame members whereby filtrate will pass through said filter cloths in a path parallel to said vertical plate members and be discharged therefrom at the edge of said filter cloths.

References Cited in the file of this patent

UNITED STATES PATENTS

| | | |
|---|---|---|
| 571,368 | Hubner | Nov. 17, 1896 |
| 707,029 | Smith | Aug. 12, 1902 |
| 707,245 | Locke | Aug. 19, 1902 |
| 2,006,131 | Durant | June 25, 1935 |
| 2,754,006 | Harris | July 10, 1956 |

FOREIGN PATENTS

| | | |
|---|---|---|
| 208,880 | Great Britain | Jan. 3, 1924 |